H. P. RHODES.
DRIVING MECHANISM FOR MOTOR VEHICLES.
APPLICATION FILED FEB. 23, 1912.

1,108,474.

Patented Aug. 25, 1914.
2 SHEETS—SHEET 1.

H. P. RHODES.
DRIVING MECHANISM FOR MOTOR VEHICLES.
APPLICATION FILED FEB. 23, 1912.

1,108,474.

Patented Aug. 25, 1914.

Witnesses:
Jas. E. Hutchinson
C. A. Krey

Inventor:
Hampton P. Rhodes
By Macon Milans Attorneys

UNITED STATES PATENT OFFICE.

HAMPTON P. RHODES, OF SHREVEPORT, LOUISIANA.

DRIVING MECHANISM FOR MOTOR-VEHICLES.

1,108,474.

Specification of Letters Patent.

Patented Aug. 25, 1914.

Application filed February 23, 1912. Serial No. 679,502.

*To all whom it may concern:*

Be it known that I, HAMPTON P. RHODES, citizen of the United States, residing at Shreveport, in the parish of Caddo and State of Louisiana, have invented certain new and useful Improvements in Driving Mechanism for Motor-Vehicles, of which the following is a specification, reference being had therein to the accompanying drawing.

This invention relates to an improvement in driving mechanism for motor vehicles and the like, and more particularly to a driving mechanism of this character in which the power for driving the wheels of the vehicle is obtained from a spring motor.

One of the objects of the invention is the provision of a driving mechanism which is provided with improved means for winding the springs of the driving motor to store-up power therein.

A further object of the invention is the provision of a separate spring motor for winding the spring of the motor which is used to drive the vehicle, in combination with means for winding the spring of the first mentioned motor from one of the rotating parts of the vehicle.

A further object of the invention is the provision of a device of this character, the various parts of which may be readily controlled by the driver of the vehicle from his seat.

Other objects of the invention will be apparent from the detailed description herein after; when read in connection with the accompanying drawings forming a part thereof, wherein a convenient embodiment of the invention is illustrated, and wherein like characters of reference refer to similar parts in the several views.

Figure 1:
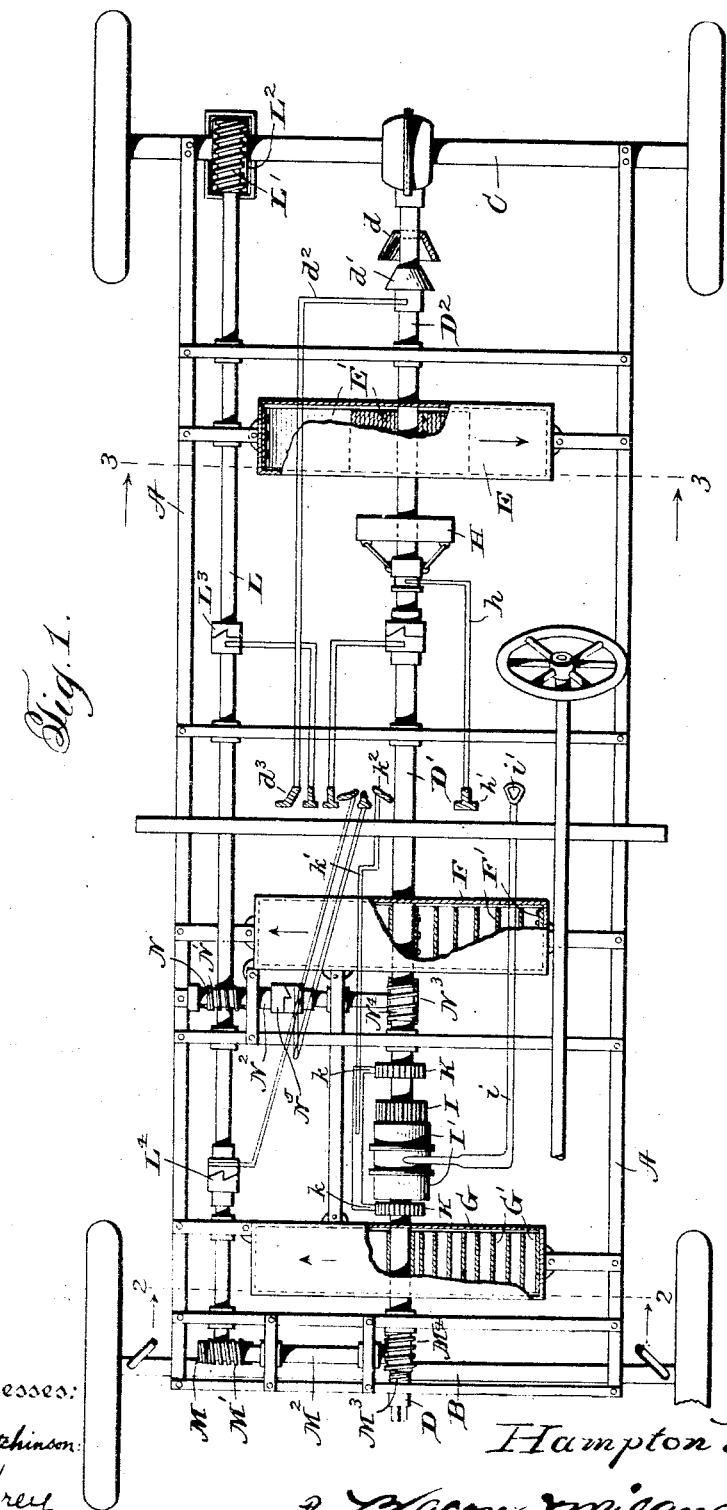
Figure 2:
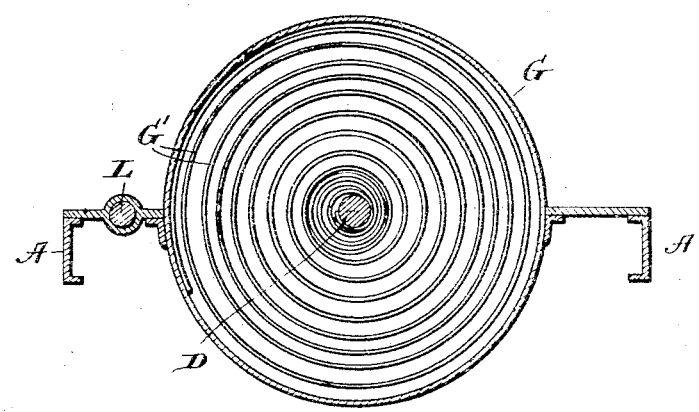
Figure 3:
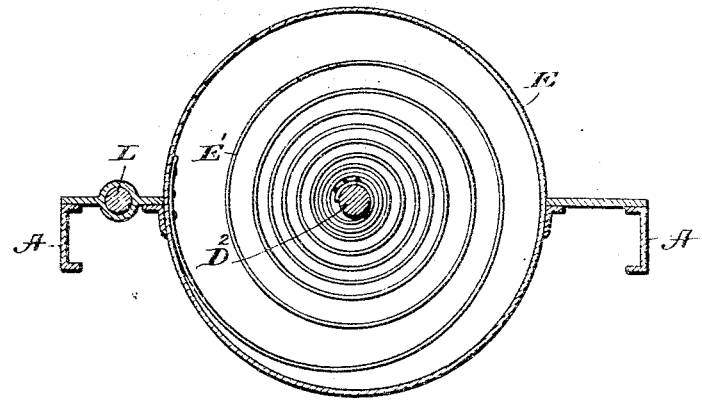
Figure 4:
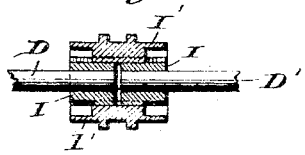

In the drawings: Figure 1 is a top plan view of the frame of a motor vehicle equipped with the improved driving mechanism; Fig. 2 is a cross section on line 2—2 of Fig. 1; Fig. 3 is a cross section on line 3—3 of Fig. 1; and Fig. 4 is a sectional view of the means employed for coupling the shaft sections intermediate the auxiliary springs.

Referring now more particularly to the drawings, A designates the frame of a motor vehicle, which may be of any well known type, B designates the front axle, which may be of any desired type and is provided with the usual steering wheels, and C designates the rear axle, which may be of any convenient type and is provided with the usual driving wheels.

Journaled in suitable bearings carried by the frame A, and extending longitudinally of said frame are three alined shafts, a forward shaft D, an intermediate shaft D' and a rear shaft $D^2$. The rear shaft $D^2$ constitutes the driving shaft proper of the mechanism and is extended into the usual differential casing carried by the rear axle C and connected by any well known type of gearing to the driving wheels of the vehicle. Fixedly supported in the frame A of the machine and overlying the shaft $D^2$ is a casing E in which is positioned a heavy coil spring E', one end of which is connected in any suitable manner to the casing E and the other end of which is connected in any suitable manner to the shaft $D^2$. The spring E' constitutes, when wound, the motor for driving the vehicle, and such spring is wound in a direction so that as it unwinds the shaft $D^2$ will be rotated to propel the vehicle in a forward direction.

Secured to the shaft $D^2$ and rotatable therewith is a member $d$ having a substantially conical recess therein and slidably mounted on the shaft $D^2$ is a member $d'$ substantially conical in shape, which is adapted to be moved into and out of frictional engagement with the member $d$. The member $d'$ is supported in any suitable manner so that it will be held against rotation and by adjusting the member $d'$ to vary the frictional engagement between the same and the member $d$, the speed at which the spring E' unwinds can be readily controlled. Suitable connections $d^2$ extend from the member $d'$ to an operating member or lever $d^3$ which is supported in any suitable manner in the machine so that it will be accessible to the operator from his seat. Any desired form of connections and operating member may be utilized, and hence I have illustrated these parts diagrammatically.

Fixedly supported in any suitable manner in the frame of the machine, and surrounding the intermediate shaft D' is a casing $F^x$ and fixedly supported in the machine frame and surrounding the forward shaft D is a similar casing G. Positioned within the casing $F^x$ is a heavy coil spring $F^y$, one end of which is connected in any suitable manner to the casing and the other end of which is connected in any suitable manner to the shaft D'. Positioned within the casing G is a spring G', one end of which is connected in any suitable manner to the casing and the other end of which is connected to the shaft D. Springs F' and G' are utilized for winding the spring E' to store up power therein in a manner to be hereinafter more particularly set forth, and for this reason the springs F' and G' are wound in a direction opposite to the spring E'.

The adjacent ends of the intermediate shaft D' and the rear shaft D² carry the members of a friction clutch H, which may be of any well known construction, so that such shafts may, when desired, be coupled together. A suitable connection h extends from the movable member of said clutch to an operating member h' which is conveniently positioned in the machine so as to be readily accessible from the operator's seat.

The adjacent ends of the front and intermediate shafts D and D' have secured thereto similar formed pinions I which are adapted to be engaged by an internally toothed sleeve I' when it is desired to couple the shafts D and D' together. The sleeve I' can be adjusted longitudinally a sufficient distance to permit the same to be moved out of engagement with one of the pinions I so as to disconnect the shafts D and D'. Longitudinal adjustment of the sleeve I' is effected by means of a suitable connection $i$ extending therefrom to an operating member $i'$ which is positioned in the machine so as to be readily accessible from the operator's seat. Carried by each of the shafts D and D' is a ratchet wheel K and suitable pawls $k\ k$ are provided which are adapted to engage said ratchet wheels to normally prevent rotation of the shafts D and D' by the springs F' and G', said pawls, however, permitting rotation of the shafts D and D' in a direction to place the springs under tension. Means is provided for simultaneously manipulating the pawls $k\ k$ to withdraw the same from engagement with the ratchet wheels K K, said means including a connection $k'$ which extends to a suitable operating member $k^2$ which is conveniently positioned adjacent the seat of the operator so as to be readily accessible therefrom.

In practice, the springs E', F', G' are wound in any suitable manner, and the pawls $k\ k$ by their engagement with the ratchet wheels K K holding the shafts D and D' from turning. The normal condition of the clutch H is such that the shafts D' and D² are disconnected. To propel the vehicle the operator manipulates the operating member $d^3$ to withdraw the conical member $d'$ from the member $d$ on the shaft D², thus permitting rotation of said shaft by the power spring E', which propels the vehicle. As the vehicle is propelled, the spring E' unwinds and to effect the rewinding of the spring E' the springs F' and G' are brought into action. This is effected by manipulating the clutch H to connect the shafts D' and D² and by manipulating the sleeve I' to connect the shafts D and D'. After the shafts D, D' and D² have been connected in this manner, the pawls $k\ k$ are withdrawn from engagement with the ratchet wheels K K thus permitting rotation of the shafts D, D' and D² in a direction to cause the rewinding of the spring E'. When the spring E' has been rewound to the desired extent, the pawls $k\ k$ are again engaged with the ratchet wheels K K to hold the shafts D and D' against further rotation and the clutch H is manipulated to disconnect the shaft D' from the shaft D².

Means is conveniently provided for utilizing the momentum of the vehicle, when coasting to store up energy in the springs F' and G'. To this end, a longitudinally disposed shaft L is journaled in suitable bearings carried by the frame of the machine, said shaft being provided at one end with a worm gear L' which meshes with a worm wheel L² secured upon the rear axle of the vehicle. The shaft L is provided adjacent the forward end thereof with a worm wheel M which meshes with a worm gear M' which is carried by a transversely extending shaft M² which is journaled in the forward portion of the frame of the machine. Carried by the shaft M² is a worm wheel M³ which meshes with a worm M⁴ which is secured upon the shaft D. Secured to the shaft L is a worm wheel N which meshes with a worm N' which is carried by a shaft N² which is journaled in suitable bearings in the frame of the machine and extends transversely thereof. The shaft N² carries a worm wheel N³ which meshes with a worm N⁴ which is carried by the shaft D'. The shaft L is divided intermediate the worm wheel N and the worm gear L' and a clutch member L³ is provided for connecting the separated portions of the shaft, suitable connections extending from the movable member of said clutch to a point adjacent the operator's seat for permitting manipulation thereof. The shaft L is also divided between the worm wheels M and N and a clutch L⁴ is provided at this point for connecting the sections of the shaft when it is desired to do so. A suitable connection extends from the movable member of the clutch L⁴ to an operating member which is conveniently positioned adjacent the seat of the operator. The transversely extending shaft N² is divided intermediate the worm N' and the worm wheel N³ and a clutch N⁵ is provided for connecting the sections of this shaft, a suitable connection extending from the movable member of said clutch to an operating member positioned adjacent the seat of the operator. From the construction thus described it will be seen that whenever the spring E' is not being utilized to drive the vehicle, as for instance when coasting, by manipulating the various clutches, the rotation of the shaft L can be utilized to store up energy in the springs F' and G'. It will also be noted that by reason of the clutches just referred to, the shaft L can be utilized to store up energy in either one or both of the springs F' and G'.

In addition to utilizing the momentum of the vehicle for storing up power in the springs F' and G', the power utilized in stopping the vehicle may also be made available for the same purpose. Thus, whenever it is desired to stop the vehicle, the operator may, instead of applying the brakes as in the ordinary manner, operate the clutch members to connect the shaft L to the shafts D and D'. The movement of the vehicle will then be resisted by the springs F' and G' and as the vehicle is brought to a stop, a certain amount of power will be stored up in the springs F' and G'.

As will be appreciated the particular arrangement of parts whereby the main spring is adapted to be wound up by the auxiliary springs avoids the necessity of supplying separate gear connections for rewinding the main spring so that the construction is much simplified. This construction is also of particular advantage in rewinding the main spring from the momentum of the vehicle. The main spring can be more completely or fully rewound from the momentum of the vehicle and for this purpose advantage can be taken of the slightest of grades to store up power irrespective of the condition of the main spring.

While I have illustrated the improved driving mechanism in connection with an automobile, it is to be understood that its use is not to be so restricted, as it may be used in connection with motor boats and the like, and the use of the term "motor vehicles" in the claims is intended to include such devices as well as automobiles.

While a convenient embodiment of the invention is illustrated in the accompanying drawings, it will be understood that many changes may be made to the form and construction therein shown without departing from the spirit and scope of the invention as defined in the appended claims.

I claim:—

1. In a motor vehicle, a drive shaft, a power spring for rotating the drive shaft, an auxiliary spring adapted to be directly connected to the power spring to wind the same, and means for connecting the auxiliary spring to the power spring.

2. In a motor vehicle, a drive shaft, a power spring for rotating said drive shaft, and means for winding said power spring including a spring motor adapted to be directly coupled thereto, and gearing between said spring motor and one of the wheels of the vehicle for storing up power therein.

3. In a motor vehicle, a drive shaft, a power spring for rotating said drive shaft, a second shaft in alinement with said drive shaft, a spring adapted to rotate said second shaft in a direction opposite to the direction of rotation of the power shaft, means for normally holding said second shaft against rotation by its spring, and means for coupling the drive shaft and said second shaft together.

4. In a motor vehicle, a drive shaft, a power spring for rotating said drive shaft, a second shaft in alinement with said drive shaft, a spring adapted to rotate said second shaft in a direction opposite to the direction of rotation of the power shaft, means for normally holding said second shaft against rotation by its spring, means for rotating said second shaft against the tension of its spring, and means for coupling the drive shaft and said second shaft together.

5. In a motor vehicle, a drive shaft, a power spring for rotating said drive shaft, a second shaft in alinement with said drive shaft, a spring adapted to rotate said second shaft in a direction opposite to the direction of rotation of the power shaft, means for normally holding said second shaft against rotation by its spring, gearing between said second shaft and one of the wheels of the vehicle for rotating said second shaft against the tension of its spring, and means for coupling the drive shaft and said second shaft together.

6. In a motor vehicle, a main spring motor for driving the vehicle, an auxiliary spring motor adapted to be directly connected to said main spring motor to act in opposition thereto to store up power in the main spring motor, and means for connecting said auxiliary motor to said main motor.

7. In a motor vehicle, a main spring motor for driving the vehicle, an auxiliary spring motor adapted to be directly connected to said main spring motor to act in opposition thereto, to store up power in the main spring motor, means for connecting said auxiliary spring motor to said main spring motor, and gearing between said auxiliary spring motor and a rotating part of the vehicle for storing up power in said auxiliary spring motor.

8. In a motor vehicle, a drive shaft, a power spring for rotating said drive shaft, an auxiliary spring motor comprising a spring, and a member adapted to be rotated thereby, gearing between the rotatable member of the auxiliary spring motor and a rotatable part of the vehicle for placing the spring of the auxiliary motor under tension, a clutch in said gearing, releasable means for normally preventing rotation of the rotatable part of the auxiliary motor by its spring, and means for coupling the rotatable member of the auxiliary motor to the drive shaft.

9. In a motor vehicle, a drive shaft, a power spring associated therewith for rotating said drive shaft, a second shaft in alinement with said power shaft, a coil spring for turning said second shaft wound in a direction opposite to said power spring, a ratchet wheel carried by said second shaft, a movable pawl engaging said ratchet wheel and normally holding said shaft against rotation by its spring, and a clutch for connecting said second shaft to said drive shaft.

10. In a motor vehicle, a drive shaft, a power spring associated therewith for rotating said drive shaft, a second shaft in alinement with said power shaft, a coil spring for turning said second shaft wound in a direction opposite to said power spring, a ratchet wheel carried by said second shaft, a movable pawl engaging said ratchet wheel and normally holding said shaft against rotation by its spring, gearing between said second shaft and a rotatable part of the vehicle, and a clutch for connecting said second shaft to said drive shaft.

11. In a motor vehicle, three alined shafts, a power spring associated with one of said shafts and adapted to drive the same in one direction, a spring associated with each of said other shafts and adapted to drive the same in a direction opposite to the direction of rotation of the power shaft, movable means for holding all of said shafts against rotation by their springs, and means for coupling said shafts together.

12. In a motor vehicle, three alined shafts, one of which is a drive shaft, a power spring for rotating said drive shaft, a spring associated with each of said other shafts and adapted to rotate the same in a direction opposite to the direction of rotation of the power shaft, means for normally holding said other shafts against rotation by their springs, a clutch for connecting said other shafts and a clutch between one of said other shafts and said power shaft.

13. In a motor vehicle, longitudinally alined front, intermediate, and rear shafts, a power spring associated with said rear shaft and adapted to rotate the same to drive the vehicle, a spring associated with said intermediate shaft and adapted to rotate the same in a direction opposite to the direction of rotation of the drive shaft, a spring associated with the front shaft and adapted to rotate the same in a direction opposite to the direction of rotation of the drive shaft, means for normally holding said front and intermediate shafts against rotation by their springs, means for coupling the front and intermediate shafts together, gearing between said front and intermediate shafts, and a rotatable part of the vehicle, and a clutch between said intermediate shaft and said drive shaft.

In testimony whereof I affix my signature in presence of two witnesses.

HAMPTON P. RHODES.

Witnesses:
 CAL D. HICKS,
 CARL SVARVA.